June 21, 1927.
G. C. MARTIN
1,633,219
METHOD OF FORMING PIPE
Filed Dec. 17, 1926
2 Sheets-Sheet 1
*Fig. 1.*
*Fig. 2.*
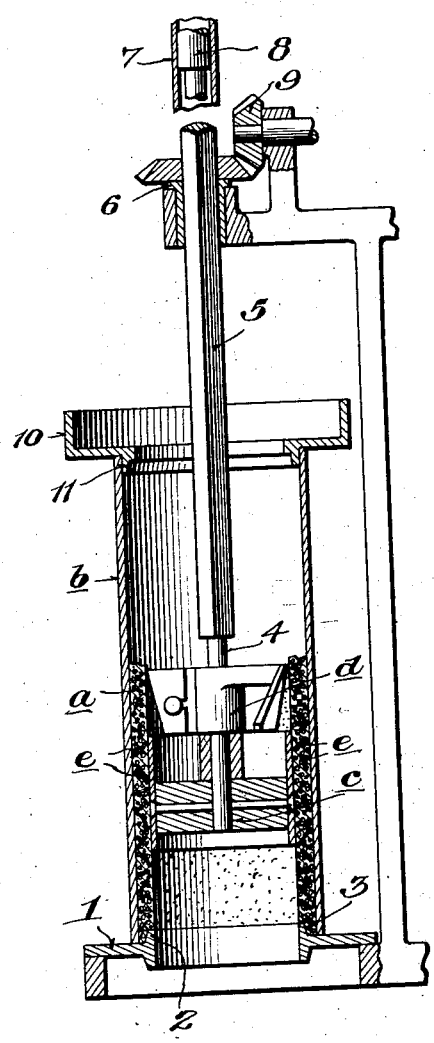
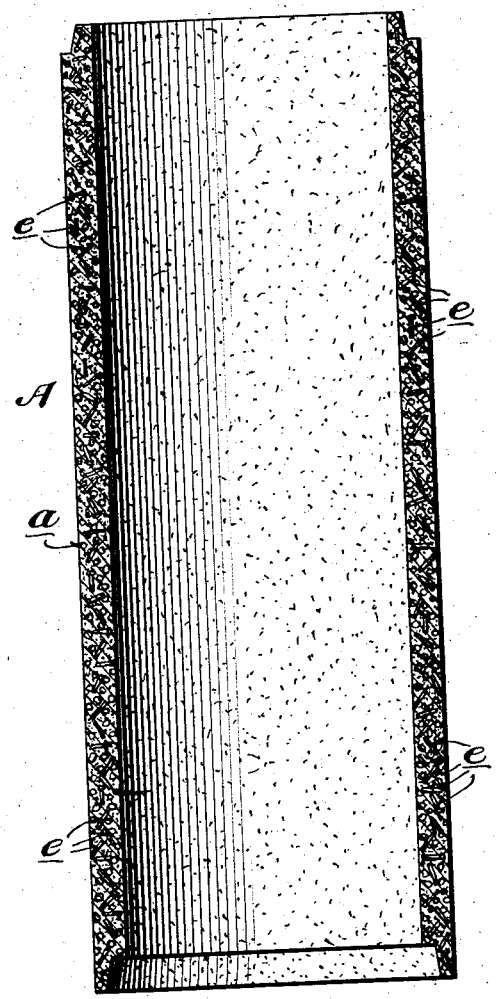
Inventor
George C. Martin,
WITNESSES:—
Emory L Groff
By Blakeslee & Brown
Attorney June 21, 1927.
G. C. MARTIN
1,633,219
METHOD OF FORMING PIPE
Filed Dec. 17, 1926
2 Sheets-Sheet 2
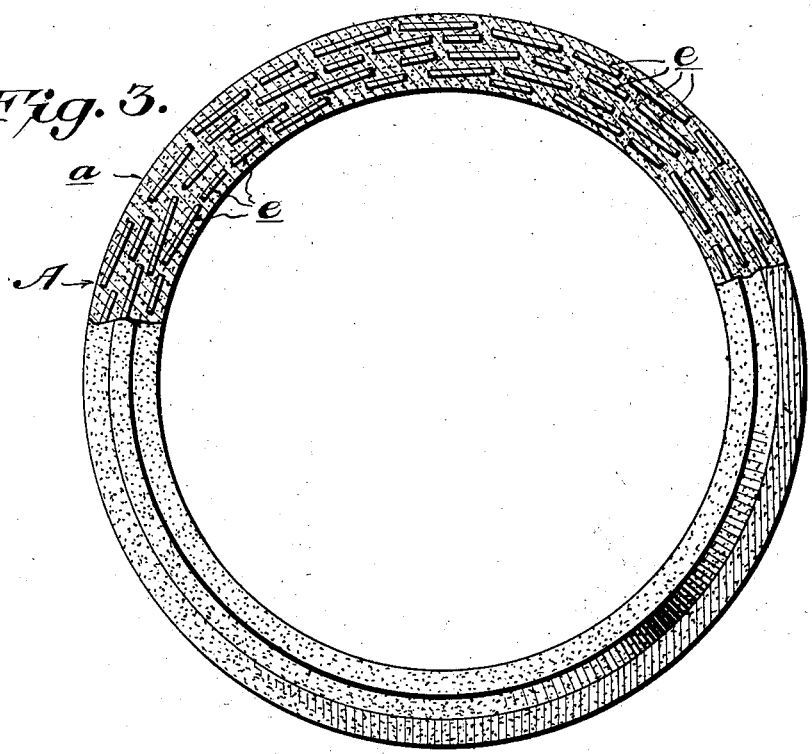
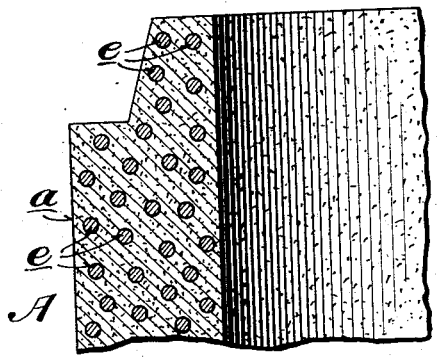
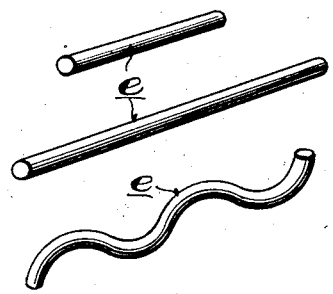
Inventor
George C. Martin,
By Blakeslee & Brown
Attorney
WITNESSES:-

Patented June 21, 1927.

1,633,219

UNITED STATES PATENT OFFICE.

GEORGE C. MARTIN, OF LOS ANGELES, CALIFORNIA.

METHOD OF FORMING PIPE.

Application filed December 17, 1926. Serial No. 155,476.

This invention relates to a method of forming pipes, and is a continuation in part of my application Serial No. 32,926 filed May 26, 1925.

In particular the invention relates to that class of pipe which is formed from a plastic mass into pipe shape by a pipe making machine, and which plastic mass subsequently hardens to produce the finished pipe.

At the present time considerable trouble is incurred in pipe formed of plastic material in that it has zones of weakness and the pipe is not capable of standing crushing strains or external hydrostatic pressures.

One of the objects of the present invention is to produce a pipe initially formed of plastic material which is capable of resisting great strains both internal and crushing when the plastic mass has hardened. A further object is to provide reinforced plastic pipe material which may be easily worked by a pipe making machine.

A further object is to provide a pipe which is initially formed of a plastic material which subsequently hardens, which can be produced at an economical cost, which has no weakened zones, and which can be made in any size desired. At the present time concrete pipe is incapable of withstanding great strains when made in any sizes and frequent replacement of sections of concrete pipe are necessary. With my invention replacements of sections will practically be done away with as the plastic mass which initially forms the pipe will be so intimately related as to be able to set up a stress that will resist any strain imposed upon the pipe.

Another object of the invention is to provide a reinforced concrete pipe wherein the metallic reinforcement has a novel and practical disposition in its relation to the plastic material forming the pipe whereby great strength and increased resistance to fracture is obtained.

Further objects include a pipe and method of making the same which will be superior in point of relative simplicity and inexpensiveness, and efficiency in conjunction with durability, serviceability and general utilization.

With the above mentioned and other objects in view the invention consists in the novel and useful provision, formation, construction, association and relative arrangement of parts, members and features all as shown in certain of its adaptations in the accompanying drawings, described in general in the specification, and more particularly pointed out in the claims.

Figure 1 is a fragmentary and partially vertical sectional view illustrating a pipe making machine in the act of making a pipe; and Figure 2 is a vertical sectional view of the finished pipe.

Figure 3 is an enlarged detail view, partly in section, illustrating the novel manner in which the lengths of metal arrange themselves according to the present process.

Figure 4 is a detail sectional view taken on the line 4—4 of Figure 3.

Figure 5 is a detail view illustrating the type of reinforcing elements used.

Corresponding parts in all the figures are designated by the same reference characters.

Referring now with particularity to the drawings I designate my improved pipe and method of making the same by A and I preferably form the pipe of some initially plastic material $a$ which is fed downwardly within a cylindrical mold $b$ and which plastic material $a$ is acted upon by forming devices $c$ and $d$ to smooth the inner surface of the plastic material and likewise pack the same so that a pipe may be formed. The outer mold $b$ is adapted to rest on a base plate 1 provided with an annular mold portion 2 so that the pipe would be flanged, as shown at 3. The device $c$ might be termed a smoothing head and the device $d$ a packing head and said smoothing head is below the packing head, the said smoothing head and packing head being mounted upon a shaft 4 having a squared portion 5 passed through a squared opening in the hub portion of a bevel gear 6, the upper end of such shaft being fitted within a cylinder 7, the said shaft having a piston head 8. A second bevel gear 9 is in mesh with the teeth of the bevel gear 6 and such bevel gear 9 is adapted to be driven by suitable power means, not shown. As the plastic material to form the pipe is fed within the hopper portion 10 which hopper portion 10 is fitted to the top of the mold $b$ and has a mold portion 11 forming the end flange of the pipe, the forming head and the packing head are being rapidly rotated so as to act upon the plastic material to form the pipe, substantially as shown in Figure 1, and at the same time the shaft 5 is being elevated to form the pipe throughout the length of the mold $b$. This elevating of the shaft is accomplished by injecting suitable fluid in the cylinder 7 to act on the head 8.

The plastic material forming the pipe may be of concrete, and into such mass of plastic concrete I pour and thoroughly mix therewith small lengths of iron, steel, or other metals e, and it is this mixture of concrete and small lengths of wire and the like that is poured into the mold b. The said small lengths of iron, steel or the like may be of any well known or available metal lengths but are preferably pieces of wire of suitable gauge, for example, about No. 12 gauge which will cut into lengths suitable for incorporation into the wall of the pipe according to the thickness of the wall and the diameter of the pipe. However, in that connection it has been found in practice that pieces of wire of approximately 1 inch to 4 inches in length effectively attain the object of the invention, and if desired the wire may be plain or crimped to meet predetermined requirements or specifications. These small lengths of metal act as reinforcements for the concrete and do not in any way interfere with the action of the smoothing head or forming head. The general appearance of the finished pipe will be that shown in Figures 3 and 4 in which it will be observed that both the outer and inner surface of the pipe will be smooth and present no rough spots.

As previously indicated, the concrete containing the small lengths of wire or the like is poured into the mold b where it is thrown by centrifugal force against the sides of the mold by the packer head d which is followed by the forming head c. As a result of the action of the packer head and former head acting on the concrete containing the short lengths of wire, the mass is so trowelled by the packer head as to leave all of the lengths of the steel reinforcement in a position circumferentially of the pipe. In other words, the wire assumes a position at right angles to the longitudinal axis of the pipe and in the finished product the various lengths of wire will arrange themselves tangentially to the arcuate inside and outside faces of the pipe. In this position the reinforcement is best adapted to add strength to the pipe and in practice it has been found that the possibility of lengthwise splitting of the pipe is reduced to a minimum.

The particular form of packing head d has been illustrated and described in my pending application for packer heads for pipe molding machines, filed in the United States Patent Office on April 20, 1925, Serial No. 24,397 which has become Patent No. 1,616,816. However, it is evident that any suitable pipe making machine may be used with the plastic mass formed in accordance with my invention. The use of long wires and rods, such as used in forming reinforced concrete buildings is entirely impractical for pipe purposes, but from experience I have found that the placement of small lengths of metal in the plastic concrete and which is thoroughly mixed with the plastic concrete so as to be uniformly distributed therein will make a pipe of great strength and which is practically unbreakable after the plastic mass has been permitted to harden.

The reason that the ordinary method of reinforcing concrete similar to the method employed in the forming of poured reinforced concrete buildings cannot be used in the forming of pipe by a pipe-making machine, is this: In building it is customary to provide long rods within a mold around which rods is a helical wire cage and the plastic concrete is poured within the mold and allowed to harden. This method might be employed in the forming of pipe providing the pipe is not made by pipe-making machine such as shown in the drawing. It is possible to provide a mold for pipe and place reinforcement therein consisting of a spiral of wire, then pour very fluid concrete within the mold. The spiral of wire will settle as the concrete settles. This would be all right so far as a poured concrete pipe was concerned, but a machine for making pipe would twist the spiral out of shape. In experiments that I have made in the making of concrete pipe by a pipe making machine, I have found that it is possible to make pipe having reinforcement consisting of a very rigid cage by means of a pipe making machine, and I have trowelled the cement so thoroughly into the mesh of the wire of the cage that the mass is practically without interstices. However, in the act of curing, concrete settles and it settles as much as an inch in a two-foot length of pipe: Therefore, if a rigid wire cage has been used, the pipe material settles and the cage does not, thus leaving interspaces in the pipe. This settling of the pipe almost always permits the cage to cut the pipe into concentric telescopical pieces. By the present method, however, the short lengths of steel wire will be arranged in myriads of small pieces en masse with the concrete so that they become an integral part thereof so that in the process of curing as the concrete settles, no break or rupture will occur in the bond between the concrete and the reinforcement. With pipe made according to the present method the bond between the metal reinforcement and the concrete is so complete that the concrete cannot break or crack under pressure before going on the steel reinforcement to carry its part of the load. Pipe formed as shown in Figures 3 and 4 for example will withstand almost double the pressure of pipes made according to other methods and if hair-line cracks should develop, they are so small as to be relatively negligible and will quickly heal under the action of the water therein. As a result of many tests pipe formed as proposd herein produces as nearly a perfect bond between the concrete and metallic reinforcement as it is believed possible to obtain.

I claim:—

1. The method of making reinforced pipe which consists in forming a mixture of plastic material and relatively small lengths of reinforcing metal, pouring the same into a hollow mold and then subjecting the mass of plastic material and metal to a rotary trowelling pressure exerted radially of the mold.

2. The method of making reinforced pipe which consists in forming a mixture of plastic material and relatively small lengths of reinforcing metal, pouring the same into a hollow mold, and then subjecting the mass of plastic material and metal to a rotary trowelling pressure exerted radially of the mold to dispose the said lengths of metal circumferentially of the finished pipe.

3. The method of making reinforced pipe which consists in forming a mixture of plastic material and relatively short pieces of wire, pouring the same into a hollow mold, and then subjecting the mass of plastic material and wires in the mold to the pressure of a rapidly rotating member travelling longitudinally in the mold to dispose the said lengths of metal circumferentially of the finished pipe.

In testimony whereof I hereunto affix my signature.

GEORGE C. MARTIN.